United States Patent
Li et al.

(10) Patent No.: US 8,571,273 B2
(45) Date of Patent: Oct. 29, 2013

(54) METHOD AND APPARATUS FOR PERFORMING FEATURE EXTRACTION USING LOCAL PRIMITIVE CODE

(75) Inventors: Jiangwei Li, Beijing (CN); Kongqiao Wang, Beijing (CN); Lei Xu, Beijing (CN)

(73) Assignee: Nokia Corporation, Espoo (FI)

( * ) Notice: Subject to any disclaimer, the term of this patent is extended or adjusted under 35 U.S.C. 154(b) by 941 days.

(21) Appl. No.: 12/470,520

(22) Filed: May 22, 2009

(65) Prior Publication Data

US 2010/0296739 A1    Nov. 25, 2010

(51) Int. Cl.
*G06K 9/00* (2006.01)
*G06K 9/50* (2006.01)
*G06K 9/62* (2006.01)

(52) U.S. Cl.
USPC ............................ 382/118; 382/201; 382/209

(58) Field of Classification Search
USPC ................................. 382/203, 118, 201, 209
See application file for complete search history.

(56) References Cited

U.S. PATENT DOCUMENTS

| | | | | |
|---|---|---|---|---|
| 5,412,738 | A * | 5/1995 | Brunelli et al. | 382/115 |
| 5,960,099 | A * | 9/1999 | Hayes et al. | 382/118 |
| 6,064,767 | A * | 5/2000 | Muir et al. | 382/190 |
| 7,006,693 | B2 * | 2/2006 | Shibuya | 382/191 |
| 7,502,495 | B2 * | 3/2009 | Zhang et al. | 382/118 |
| 7,526,123 | B2 | 4/2009 | Moon et al. | |
| 8,041,118 | B2 * | 10/2011 | Fowell | 382/181 |
| 8,160,367 | B2 * | 4/2012 | Lakare | 382/199 |
| 8,170,340 | B2 * | 5/2012 | Klefenz | 382/187 |
| 2004/0234167 | A1 * | 11/2004 | Pipitone | 382/305 |
| 2005/0180626 | A1 * | 8/2005 | Moon et al. | 382/159 |
| 2005/0207653 | A1 * | 9/2005 | Nikitin | 382/202 |
| 2006/0204081 | A1 | 9/2006 | Zhang et al. | |
| 2008/0199077 | A1 | 8/2008 | Fowell | |
| 2008/0273761 | A1 | 11/2008 | Kawata | |
| 2009/0060288 | A1 | 3/2009 | Myers et al. | |
| 2009/0226034 | A1 * | 9/2009 | Seki | 382/103 |

(Continued)

FOREIGN PATENT DOCUMENTS

EP    2043293 A1    4/2009
WO   WO 2006/061365 A1    6/2006

OTHER PUBLICATIONS

Turk et al, "Eigenfaces for Recognition", *Journal of Cognitive Neuroscience*, vol. 3, No. 1, pp. 71-86, 1991.

(Continued)

*Primary Examiner* — Kathleen Y Dulaney
(74) *Attorney, Agent, or Firm* — Alston & Bird LLP

(57) ABSTRACT

Various methods for feature extraction using local primitive code are provided. One example method includes determining an origin block within an image, an arc, an arc orientation, and a distance between the origin block and the arc. In this regard, the origin block may include one or more pixels of the image. The example method also includes determining at least one arc block. In this regard, the arc block may be located on the arc and the arc may be located with respect to the origin block based on the arc orientation and the distance. Some or all of the at least one arc blocks may include one or more pixels of the image. The example method also includes determining at least one feature value based on attributes of the origin block and the at least one arc block. Similar and related example methods and example apparatuses are also provided.

20 Claims, 6 Drawing Sheets

(56) References Cited

U.S. PATENT DOCUMENTS

2009/0290797 A1* 11/2009 Arakawa et al. ............... 382/177
2009/0310819 A1* 12/2009 Hatano ......................... 382/100
2010/0080469 A1* 4/2010 Liu et al. ....................... 382/201

OTHER PUBLICATIONS

Belhumeur et al., "Eigenfaces vs Fisherfaces: recognition using class specific linear projection", *IEEE Transaction on Pattern Analysis and Machine Intelligence*, vol. 20, No. 7, pp. 711-720, 1997.

Savvides et al., "Class Dependent Kernel Discrete Cosine Transform Features for Enhanced Holistic Face Recognition in FRGC-II", *International Conference on Acoustics, Speech and Signal Processing*, pp. II-185-II-188, 2006.

Ahonen et al., "Face Recognition with Local Binary Patterns", *European Conference on Computer Vision*, pp. 469-481, 2004.

Liu et al., "Gabor Feature Based Classification Using the Enhanced Fisher Linear Discriminant Model for Face Recognition", *IEEE Transaction on Image Processing*, vol. 11, No. 4, pp. 467-476, 2002.

Heisele et al., "Face Recognition with Support Vector Machines: Global versus Component-based Approach", *International Conference on Computer Vision*, vol. 2, pp. 688-693, 2001.

Zhang et al., "Face Recognition with Local Steerable Phase Feature", *Pattern Recognition Letter*, 27(6):1927-1933, Jun. 2006.

International Search Report and Written Opinion for Application No. PCT/IB2010/001135 dated Sep. 17, 2010.

Nutao, T. et al., *Face Recognition Based on a Single Image and Local Binary Pattern*, Second International Symposium on Intelligent Information Technology Application, Computer Society, IEEE, Aug. 2008, pp. 366-370.

Shan, C. et al., *Facial Expression Recognition Based on Local Binary Patterns: A Comprehensive Study*, Image and Vision Computing, vol. 27, (2009), pp. 803-816.

Chi, Y. et al., *ALSBIR: A Local-Structure-Based Image Retrieval*, Pattern Recognition, vol. 40, (2007), pp. 244-261.

Yuen, P. C. et al., *A Novel Method for Parameter Estimation of Digital Arc*, Pattern Recognition Letters, vol. 17, (1996), pp. 929-938.

Hammal, Z. et al., *Parametric Models for Facial Features Segmentation*, Signal Processing, vol. 86, (2006), pp. 399-413.

Jo Chang-yeon, *Face Detection Using LBP Features*, CS 229 Final Project Report, Dec. 12, 2008, pp. 1-4.

Picasa Web Albums—Name Tags [on-line] [retrieved May 6, 2009]. Retrieved from the Internet: <URL: http://picasa.google.com/features-nametags.html>. 1 page.

Office Action for Chinese Application No. 201080022544.8; dated Mar. 20, 2013.

* cited by examiner

METHOD AND APPARATUS FOR PERFORMING FEATURE EXTRACTION USING LOCAL PRIMITIVE CODE

TECHNICAL FIELD

Embodiments of the present invention relate generally to mechanisms that support wireless communications, and, more particularly, relate to a method and apparatus for performing feature extraction using local primitive code.

BACKGROUND

Due to the digital nature of image files captured using digital photography techniques, numerous mechanisms for analyzing captured image files have been developed. For example, various techniques for object recognition, which includes face recognition, have been developed to extract meaningful information from the image files. Many object recognition techniques, rely upon feature extraction to build models of the object to be identified. One common example of a technique for object recognition uses Local Binary Patterns (LBPs) via homo-Gaussian derivatives. While these techniques provide mechanisms for object recognition, many of the techniques, including the LBP approach, often involve substantial computation and processing of the image file to perform feature extraction. Additionally, many techniques can be susceptible to noise in the captured images, resulting in degraded recognition performance.

BRIEF SUMMARY

Methods and apparatus are described that provide for performing feature extraction using Local Primitive Code (LPC). According to various example embodiments of the present invention, feature extraction, to identify primitives within an image, may be performed based on LPC operators including an origin block and one or more arc blocks within an image. According to some example embodiments, the origin block may include one or more pixels of an image, and some or all of the arc blocks may include one or more pixels of the same image. The origin block may be determined to be any block of one or more pixels within an image. The origin block may be associated with a determined arc, distance between the origin block and the arc, and arc orientation. Based on the distance and the arc orientation, the location of the arc may be defined. Arc blocks may be determined that are located on the arc. For example, an arc may have arc blocks located at predefined locations, such as at relative equidistant locations along the arc. A gray value for the origin block and gray values for the arc blocks may be determined and compared to determine a feature value. In some example embodiments, some or all of the comparisons between the origin block gray value and an arc block gray value may identify a binary number. The comparisons of the gray values may be used in conjunction with an ordering of the arc blocks to combine the binary numbers to determine the feature value. The feature value may be representative of primitives identified within the image and the feature value may be used to facilitate object recognition.

Various example embodiments of the present invention are described herein. One example embodiment is a method for feature extraction using local primitive code. The example method includes determining an origin block within an image, an arc, an arc orientation, and a distance between the origin block and the arc. The origin block may include one or more pixels of the image. The example method also includes determining at least one arc block. In this regard, some or all of the arc blocks may include one or more pixel and may be located on the arc and the arc may be located with respect to the origin block based on the arc orientation and the distance. The example method also includes determining at least one feature value based on attributes of the origin block and the at least one arc block.

Another example embodiment is an example apparatus for feature extraction using local primitive code. The example apparatus comprises at least one processor and at least one memory including computer program code. The at least one memory and the computer program code may be configured to, with the at least one processor, cause the example apparatus or another apparatus to perform various functionality. For example, the example apparatus or the other apparatus may be caused to perform determining an origin block within an image, an arc, an arc orientation, and a distance between the origin block and the arc. The origin block may include one or more pixels of the image. The example apparatus or the other apparatus may also be caused to perform determining at least one arc block. In this regard, some or all of the arc blocks may include one or more pixels and may be located on the arc and the arc may be located with respect to the origin block based on the arc orientation and the distance. The example apparatus or the other apparatus may also be caused to perform determining at least one feature value based on attributes of the origin block and the at least one arc block.

Another example embodiment is an example computer program product for feature extraction using local primitive code. The example computer program product comprises at least one computer-readable storage medium having executable computer-readable program code instructions stored therein. The computer-readable program code instructions of the example computer program product are configured to determine an origin block within an image, an arc, an arc orientation, and a distance between the origin block and the arc. The origin block may include one or more pixels of the image. The computer-readable program code instructions of the example computer program product are also configured to determine at least one arc block. In this regard, some or all of the arc blocks may include one or more pixel and may be located on the arc and the arc may be located with respect to the origin block based on the arc orientation and the distance. The computer-readable program code instructions of the example computer program product are further configured to determine at least one feature value based on attributes of the origin block and the at least one arc block.

Another example embodiment is an apparatus for feature extraction using local primitive code. The example apparatus includes means for determining an origin block within an image, an arc, an arc orientation, and a distance between the origin block and the arc. The origin block may include one or more pixels of the image. The example apparatus also includes means for determining at least one arc block. In this regard, some or all of the arc blocks may include one or more pixels and may be located on the arc and the arc may be located with respect to the origin block based on the arc orientation and the distance. The example apparatus also includes means for determining at least one feature value based on attributes of the origin block and the at least one arc block.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
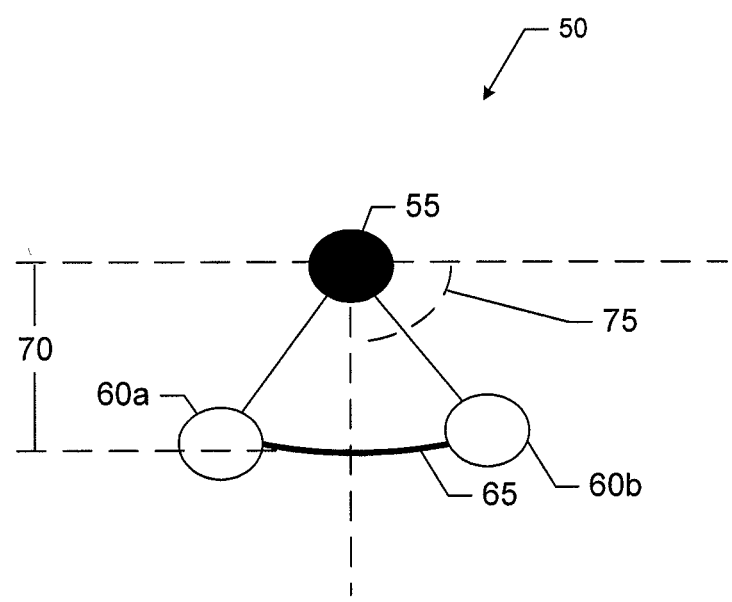
FIG. 1 illustrates an example local primitive code operator according to various example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

In accordance with example embodiments of the present invention, feature extraction via local primitive code (LPC) is performed on an image, such as a digital image, to facilitate fast and accurate object recognition. According to various example embodiments, LPC feature extraction applies symmetric and/or asymmetric LPC operators to a region of an image, and, based on attributes of pixels or blocks of pixels within the region and directional ordinal relationships associated with the operator, a feature value may be determined. The LPC operators may therefore be used to code local textures of the regions of an image, possibly at different scales and orientations, to generate feature values in the form of binary codes. By applying multiple LPC operators to an image, numerous filtered feature maps with complementary information may be generated and the information gathered from the feature maps may be fused. The fused feature maps may be used to facilitate efficient object recognition.

Example embodiments of the present invention may also be utilized to perform face recognition. Compared to face recognition solutions that rely upon homo-Gaussian derivatives, example embodiments of the present invention have reduced computation costs and achieve increased recognition performance. Reduced computation costs can facilitate utilization of example embodiments of the present invention on mobile devices, such as mobile terminals. Example embodiments of the present invention also provide for an increasingly robust solution that obtains richer feature maps having improved resilience to image noise. Feature maps that may be generated via LPC operators at various scales and orientations and may provide complementary information for facilitating increasingly accurate face recognition.

According to various example embodiments, feature extraction using LPC operators may be utilized to perform face recognition within a collection of images to then allow for sorting of the images based on the faces recognized in the images. For example, consider a digital photo album that includes a collection of photographs within the collection depicting various individuals. Example embodiments of the present invention may perform face detection and face alignment with respect to some or all of the photographs. For some or all of the faces, feature extraction using LPC operators may be performed. Based on the results of the feature extractions, facial recognition may be performed to identify photographs having a common individual. As such, a collection of photographs may be sorted by a particular individual to generate sub-collections that include only pictures that depict the particular individual.

As stated above, example embodiments of the present invention may be applicable to object recognition, as well as face recognition (a type of object recognition). While example embodiments of the present invention described below and generally herein may described within the context of face recognition, it is contemplated that example embodiments are equally applicable to general object recognition as well.

According to example embodiments of the present invention, face recognition may include the operations of registration and recognition. With respect to registration, face images of an individual may be collected and analyzed via feature extraction. The face images may include various representative examples of the associated individual. In this regard, as the number of images considered is increased, face recognition performance may be improved. For some or all of the face images, the face may be normalized to a predetermined size in combination with a face detection and face alignment process. Features may then be extracted from the normalized face image and stored in a library associated with an identity.

With respect to recognition, features may be extracted from an image including an unknown face. The features may be compared with some or all features in the registered library using a similarity evaluators. Example similarity evaluators may consider comparisons between of various distance metrics, such as Euclidean distance metrics (e.g., the L1 distance and/or the L2 distance), a Nearest Euclidean distance, or other distance metrics used for determining the similarity of faces.

Regardless of the type of similarity evaluator utilized, the information considered may be generated via feature extraction. As such, the quality of the feature extraction may play an important role in generating accurate face recognitions. According to various example embodiments, feature extraction via LPC may mine intrinsic personal information from images, which can allow for the use of relatively simple distance metrics for recognition. As a result, increased time and computation efficiency may be realized for face recognition as well as increased recognition accuracy.

As mentioned above, feature extraction via LPC operators may involve the consideration of pixel attributes, where the pixels are determined based on directional ordinal relationships determined via the operator. According to various example embodiments, the attributes of blocks of pixels may be evaluated. FIG. 1 depicts an example LPC operator 50. The LPC operator 50 may be defined with respect to an origin block 55, an arc 65, a distance 70, and an arc orientation 75. The origin block 55 may include one or more pixels. An origin block 55 of more than one pixel may take the form of any shape, such as a square, rectangle, triangle, circle, etc. The origin block 55 may be located, for example centered, at any location within the image and feature extraction may be performed with respect to the associated location. In some example embodiments, the origin block 55 may be located at a pixel that is central to the origin block 55 within an image upon which feature extraction is to be performed. The parameters of the LPC operator may also be determined. In this regard, the arc 65, which may be symmetric about the origin block 55 or asymmetric about the origin block 55, may be determined. Further, the distance 70 and the arc orientation 75 may also be determined. The arc orientation 75 may be represented by an angle value between a reference and a point on the arc. Based on the construction of the LPC operator 50 via the determining parameters, arc blocks 60 (e.g., arc block 60*a* and 60*b*) may be defined. Similar to the origin block 55, an arc block 60 may include one or more pixels and an arc block 60 may be any shape. In some example embodiments, the arc blocks 60 may be located at predefined positions along the arc 65, such as at equidistant positions along the arc 65. The number of arc blocks may also be determinable. For example, a given LPC operator may have one arc block or a plurality of arc blocks. According to various example embodiments, an ordering of the arc blocks 60 may also be defined to thereby define ordinal relationships between the arc block 60 and the origin block 55. For example, a counterclockwise ordering may be determined, such that arc block 60*a* is ordered before arc block 60*b*.

Figure 2:
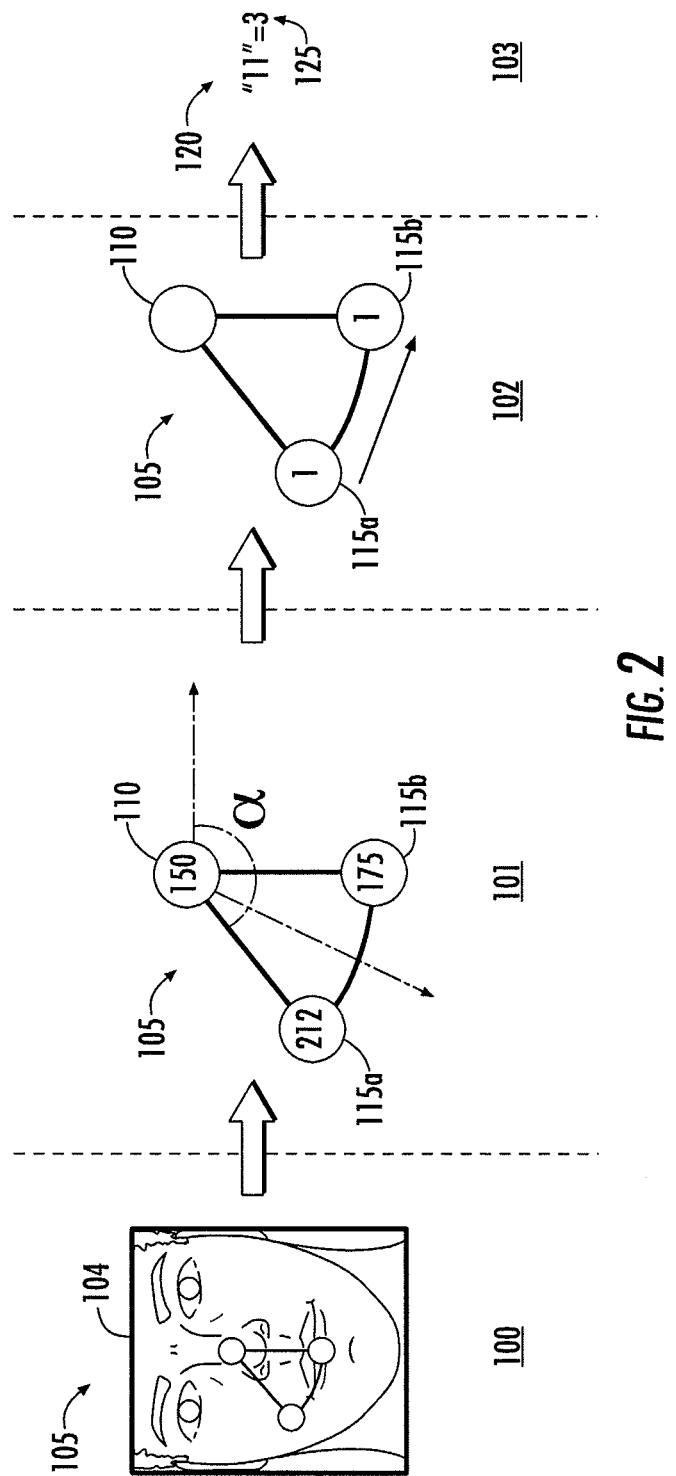
FIG. 2 illustrates a method for implementing a local primitive code operator to perform feature extraction according to various example embodiments of the present invention.

FIG. 2 depicts an example process for implementing an example LPC operator for feature extraction. At 100, a face image 104 is considered and an example LPC operator 105 has been applied to a determined location within the face image 104. In accordance with various example embodiments, face detection, alignment, and normalization may have been previously performed to generate the face image 104.

At 101, gray values for the origin block 110 and the arc blocks 115*a* and 115*b* have been determined (indicated by the numbers inside the circles representing the pixels). In this regard, in an example embodiment where origin block 110 includes only a single pixel and arc blocks 115*a* and 115*b* include only a single pixel, the respective gray values of the blocks may be gray values of the pixels included in the blocks. In an example embodiment where the origin 110 and/or the arc blocks 115 include more than one pixel, the gray values of the pixels included in each respective block may be combined. For example, the gray values of the pixels of a particular block may be summed, averaged, or some other combination of the gray values may be utilized. At 102, the gray values of some or all of the arc blocks may be compared to the gray value of the origin block 110. The example of FIG. 2 implements a binary solution, and as such, if the gray value of the arc block is greater than or equal to the gray value of the origin block, the arc block may be assigned a one. On the other hand, if the gray value of an arc block is less than the gray value of the origin block, the arc block may be assigned a zero. With respect to the scenario depicted at 102 of FIG. 2, both arc blocks 115*a* and 115*b* have gray values greater than the origin block 110. As such, both arc blocks 115*a* and 115*b* are assigned ones. Note that while some example embodiments of the present invention may use gray values in the comparison of the block, other attributes of the pixels included in the blocks may be utilized (e.g., red, green, blue values, or the like).

At 103, based on a defined counterclockwise ordering of the arc blocks, the assigned values of the arc blocks are concatenated. In the example scenario depicted at 103, the ones from the arc blocks 115*a* and 115*b* are concatenated to generate the binary number "11." According to various example embodiments, the resultant binary number may be converted to a decimal number, in this case the number "3."

The converted number may be referred to as the feature value for an instance of a feature extraction process. In accordance with the example depicted in FIG. 2, the feature value is a converted decimal number associated with the assigned and concatenated binary number. However, one of skill in the art would appreciate that any type of numbering scheme or representation of the results of the gray value comparison may be utilized to generate a feature value.

Figure 3:
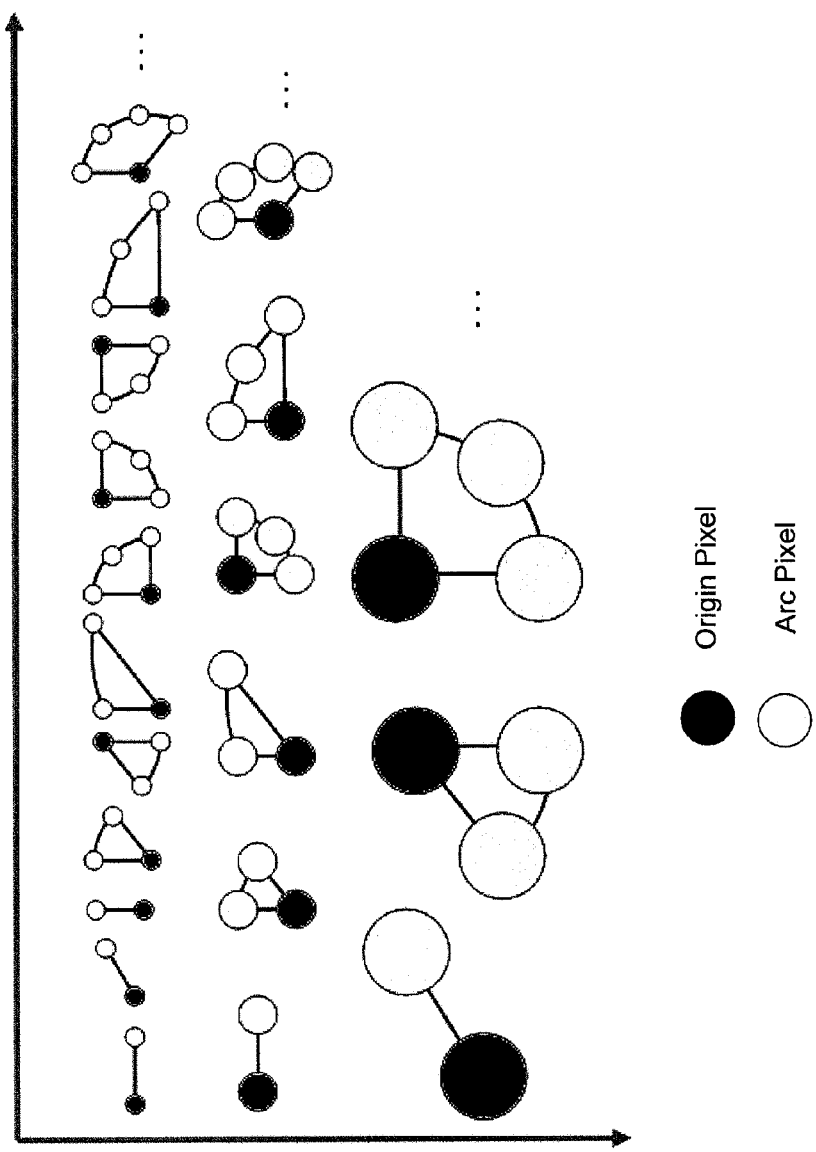
FIG. 3 illustrates additional local primitive code operators according to various example embodiments of the present invention.

According to various example embodiments, the feature extraction process described with respect to FIG. 2 may be repeated by determining or selecting a different location for the origin block and using the same LPC operator in a repeated fashion. As such, feature extraction may be performed for some or all locations (e.g., central pixels) within a given image. Further, the LPC operator may be modified (e.g., via determination of a different arc, a different distance, a different arc orientation, different size origin and/or arc blocks, and/or a different number or ordering of arc blocks), and the modified LPC operator may be used to generate different feature extractions of an image. The LPC operators may be capable of coding ordinal relationships between image pixels or image blocks (e.g., origin blocks and arc blocks), embodied in a variable circle radius of LPC operators. Comparisons between larger image blocks may provide for the mining of more stable features instead of more subtle features from images. Examples of different LPC operators are depicted in FIG. 3. Along horizontal axis of FIG. 3, the number of image blocks in comparison and orientations of LPC operators are changeable to obtain various kinds of local structures. Along the vertical axis, the radius of the LPC operators are variable to mine low or high frequency features from images. Further, different sized origin and arc blocks are also depicted. Additionally, different arcs, such as non-circular or asymmetric arc may be utilized. According to some example embodiments, asymmetric arc may be used for irregular image primitive textures.

Because the feature extraction process, as described above, may code the ordinal relationships of nearby blocks or pixels (when the distance is relatively small) with binaries, the feature values may be considered robust with respect to lighting variations and image noise. In particular, due to a reduced number of considered blocks or pixels in each extraction, as compared to an LBP solution (which involves comparisons of eight pixels), noise is less likely to be introduced to the feature values. Further, since feature extraction via LPC operators may extract an image pattern along some determined arc orientation, primitives may be obtained for the particular orientation in association with a particular channel. In this regard, a channel may be an image information retriever, for example via an LPC operator, which is able to output a particular feature map. Maps from different channels may be information complementary. As such, since feature extraction via LPC operators may extract an image pattern along some determined arc orientation, primitives may be obtained for the particular orientation to retrieve some particular image information. As a result, feature extractions may be performed with respect to some or all orientations to obtain complementary information about the image. Additionally, since the number of comparisons performed is limited to the number of arc blocks (particularly when the blocks include a single pixel), feature extraction may be computationally less expensive and require less memory resources. As a result, more rapid face recognition solutions may be realized.

Figure 4:
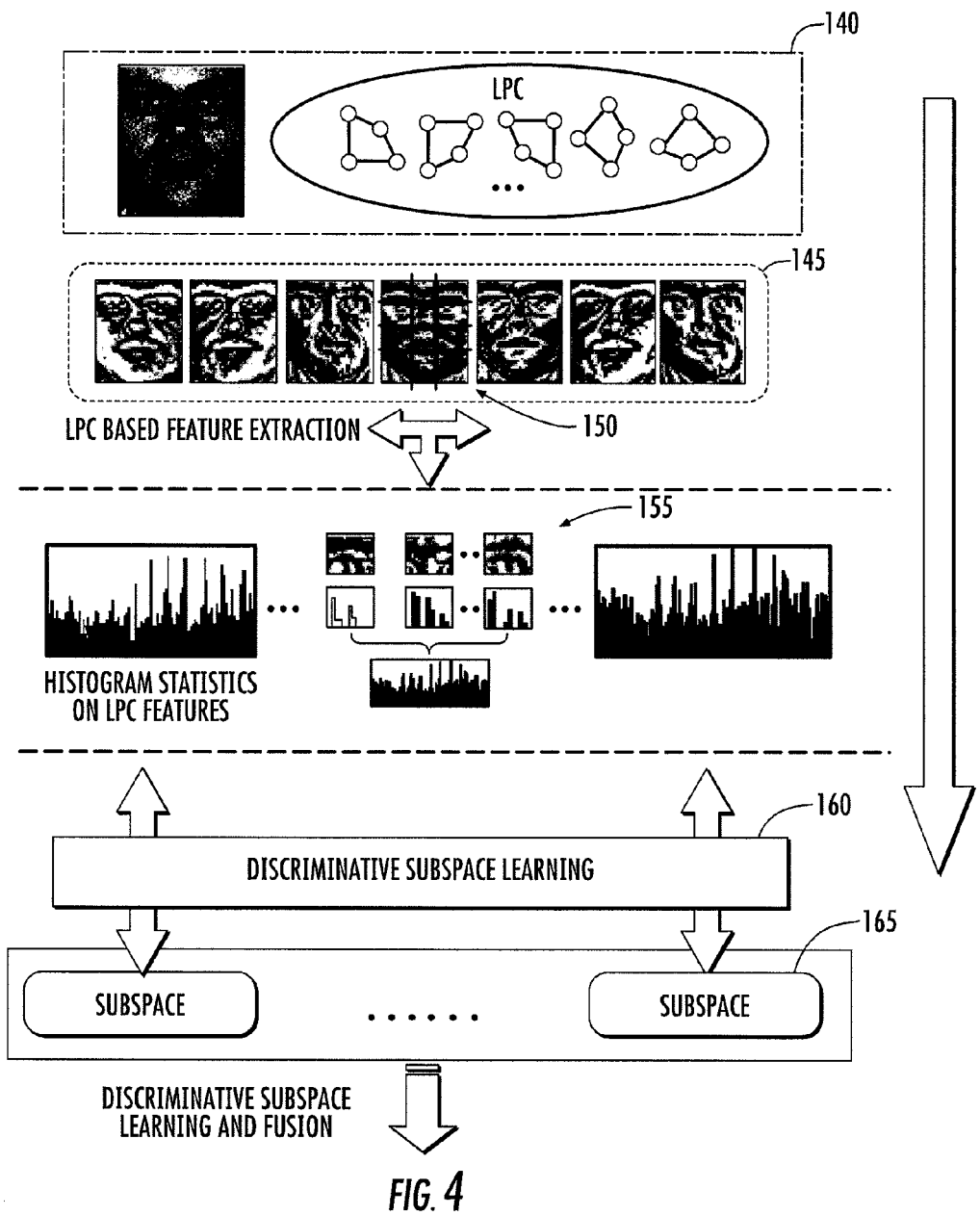
FIG. 4 illustrates an example method for performing face recognition according to various example embodiments of the present invention.

FIG. 4 illustrates an example face recognition method in accordance with various example embodiments of the present invention. As depicted in FIG. 4, face recognition based on LPC may be divided into three operations including LPC based feature extraction, histogram statistics on LPC features, and discriminative subspace learning and fusion.

As mentioned above, LPC based feature extraction may be performed in a flexible manner with the use of one or more LPC operators to extract and identify local image textures and structures. Further, the use of different LPC operators may generate a pool of information regarding a given image. In this regard, feature extraction may be performed on the image at 140 using various LPC operators. Feature values may be obtained with respect to some or all locations or pixels within the image. For example, for each LPC operator, feature values may be determined where each pixel of the image corresponds to the location of the origin block. The results may be drawn as a feature map at 145. In this regard, each LPC operator may be used to generate a respective feature map. For example, if I LPC operators are to be utilized in a given scenario, an LPC operator $L_i$, where $1<i<I$, may be used to generate feature values $D_i$, which may be draw as a feature map. The feature maps may depict the image textures captured through feature extraction. Due, for example, to the differences in arc orientation of the LPC operators, each feature map may provide complementary information associated with the image. Each feature map may provide uniform usefulness for specific information mining. For example, with a particular scale and orientation, local image primitives of the image may be obtained within the associated channel.

At 155, a histogram statistics strategy may be implemented to further improve noise tolerance and lessen face alignment errors. Further, to avoid losing face spatial information by applying histogram statistics, a feature map $D_i$ may be divided into J map blocks, such as depicted at 155, and histogram values may be determined with respect to some or all of the map blocks. To determine the histogram values for each map block $p_j$, where $1<j<J$, a count of the number of occurrences of a feature value within the map block $p_j$ may be determined, and associated histogram values $h_j$ may be generated. The histogram value for some or all of the map blocks may be concatenated into a histogram feature vector $H_i=\{h_1, h_2, \ldots, h_J\}$ with face spatial information. As a result, a histogram feature vector $H_i$, where $1<i<I$, may be generated with respect to some or all of the corresponding feature maps $D_i$, where $1<i<I$. Accordingly, map block-based local image information may be compiled into the histogram feature vector.

Based on the histogram feature values, discriminative subspace learning and fusion may be performed at 160. In this regard, with respect to more than one face image, discriminative methods such as Linear Discriminative Analysis (LDA), may be used to identify and learn intra-class variations and maximize inter-class separations to improve face recognition performance, where the class includes the a collection of face images of a given individual. Given a specific LPC operator, intra-class variations are feature differences of any two face images within a class, and inter-class variations are feature differences of any two images from any two classes.

In this regard, assume that N individuals are associated with M face images for registration purposes. For an LPC operator $L_i$, N×M histogram feature vectors may be generated. The histogram feature vectors may be input into an LDA learner to obtain a discriminative subspace $S_i$. Considering the example above, if there are I LPC operators, I subspaces 165 may be generated. The generated subspaces may be complementary in discriminative information, and fusion of subspaces may greatly improve face recognition performance. According to various example embodiments, the sum fusion rule may be used in a decision layer to combine the recognition scores of all subspaces. For example, given a face image t and a subspace $S_i$, where $1<i<I$, its subspace coefficients $V_{1i}$ are computed by projecting histogram feature vector H onto the subspace. For any two features $V_{1i}$ and $V_{2i}$ obtained in the subspace $S_i$, the similarity score $W_i$ can be estimated by using some distance metrics, e.g., Euclidean distance. Based on fusion theory, as different $S_i$ learns different discriminative information, the fusion of all $W_i$, where $1<i<I$, may greatly improve face recognition performance.

Figure 5:
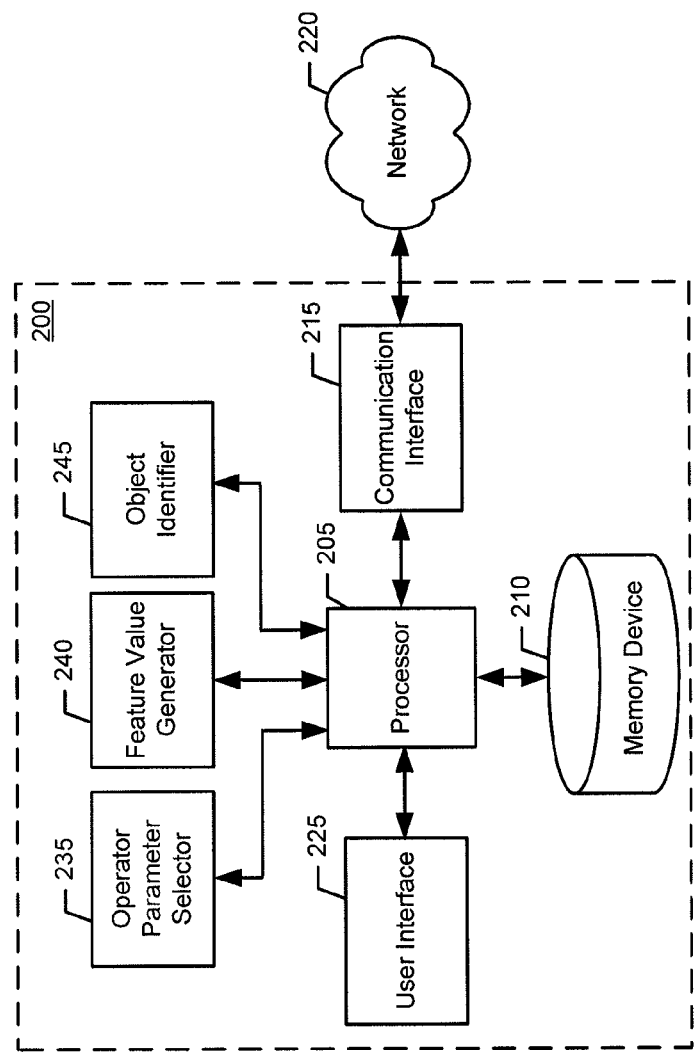
FIG. 5 illustrates a block diagram of an example apparatus for feature extraction using local primitive code according to various example embodiments of the present invention.

The description provided above and generally herein illustrates example methods, example apparatuses, and example computer program products for extracting features and performing object (e.g., face) recognition. FIG. 5 illustrates an example embodiment of the present invention in the form of an example apparatus 200 that is configured to perform various aspects of the present invention as described herein. The example apparatus 200 may also be configured to perform example methods of the present invention, such as those described with respect to FIGS. 2, 4, and 6.

Referring now to FIG. 5, in some example embodiments, the apparatus 200 may, but need not, be embodied as, or included as a component of, a communications device with wired or wireless communications capabilities. In some example embodiments, the apparatus 200 may include or be included within a computer, or a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like.

The example apparatus 200 includes or is otherwise in communication with a processor 205, a memory device 210, a operator parameter selector 235, and a feature value generator 240. In some embodiments, the example apparatus 200 may optionally include a communications interface 215, a user interface 225 including an image capturing device, and/or an object identifier. The processor 205 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors operating in concert. The processor 205 may, but need not, include one or more accompanying digital signal processors. In some example embodiments, the processor 205 is configured to execute instructions stored in the memory device 210 or instructions otherwise accessible to the processor 205. As such, whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The communication interface 215 may be any device or means embodied in either hardware, a computer program product, or a combination of hardware and a computer program product that is configured to receive and/or transmit data from/to a network and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including a processor for enabling communications with network 220. Via the communication interface 215 and the network 220, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 225 may be in communication with the processor 205 to receive user input via the user interface 225 and/or to present output to a user as, for example, audible, visual, mechanical or other output indications. The user interface 225 may include, for example, a keyboard, a mouse, a joystick, a display (e.g., a touch screen display), a microphone, a speaker, or other input/output mechanisms. According to various example embodiments, the user interface 225 may include hardware and/or software to support the operation of an image capturing device, such as a camera module. The image capturing device may be configured to capture images that may be acted upon in accordance with example embodiments of the present invention.

The operator parameter selector 235, the feature value generator 240, and/or the object identifier 245 of example apparatus 200 may be any means or device embodied, partially or wholly, in hardware, a computer program product, or a combination of hardware and a computer program product, such as processor 205 implementing stored instructions to configure the example apparatus 200, or a hardware configured processor 205, that is configured to carry out the functions of the operator parameter selector 235, the feature value generator 240, and/or the object identifier 245 as described herein. In an example embodiment, the processor 205 includes, or controls, the operator parameter selector 235, the feature value generator 240, and/or the object identifier 245. The operator parameter selector 235, the feature value generator 240, and/or the object identifier 245 may be, partially or wholly, embodied as processors similar to, but separate from processor 205. In this regard, the operator parameter selector 235, the feature value generator 240, and/or the object identifier 245 may be in communication with the processor 205. In various example embodiments, the operator parameter selector 235, the feature value generator 240, and/or the object identifier 245 may, partially or wholly, reside on differing apparatuses such that some or all of the functionality of the operator parameter selector 235, the feature value generator 240, and/or the object identifier 245 may be performed by a first apparatus, and the remainder of the functionality of the operator parameter selector 235, the feature value generator 240, and/or the object identifier 245 may be performed by one or more other apparatuses.

The operator parameter selector 235 may be configured to cause the apparatus 200 or another apparatus to perform various functionalities. In this regard, the operator parameter selector 235 may be configured to determine, possibly via selection, an origin block within an image, an arc, an arc orientation, and a distance between the origin block and the arc. The origin block may include one or more pixels of the image. In some example embodiments, the selected arc may be an asymmetric arc. The operator parameter selector 235 may also be configured to determine, possibly via selection, at least one arc block. Some or all of the arc blocks may include on or more pixels and may be determined such that some or all of the arc blocks are located on the arc. Further, the arc may be located with respect to the origin block based on the arc orientation and the distance.

The feature value generator 240 may be configured to cause the apparatus 200 or another apparatus to perform various functionalities. In this regard, the feature value generator 240 may be configured to determine at least one feature value based on attributes of the origin block and the at least one arc block. In this regard, according to some example embodiments, the attributes of the origin block and the at least one arc block may be gray values associated with the blocks. The feature value generator 240 may therefore be configured to determine an origin block gray value for the origin block and at least one arc block gray value for the at least one arc block, and determine a feature value based on a comparison between the origin block gray value and the at least one arc block gray value. The feature value may also be determined based on a predefined ordering of the at least one arc block.

According to some example embodiments, the feature value generator 240 may also be configured to combine or aggregate one or more feature values. In this regard, the feature value generator 240 may be configured to include at least one feature value in a feature map. The feature map may include a plurality of feature values. The feature value generator 240 may also be configured to divide the feature map into a plurality of map blocks. For some or all of the map blocks, the feature value generator 240 may be configured to determine a respective map block histogram value based on numbers of occurrences of common feature values within the respective map blocks. Upon generating map block histogram values for some or all of the map blocks, the feature value generator 240 may be configured to concatenate the map block histogram values to generate a histogram feature vector. In some example embodiments, the feature value generator 240 may be further configured to generate at least one subspace by performing a linear discriminative analysis based on the histogram feature vector.

The object identifier 245 may be configured to cause the apparatus 200 or another apparatus to perform various functionalities. In this regard, the object identifier 245 may be configured to determine an identity of an object. In some example embodiments, the object to be identified may be a face of an individual. The object may be identified by comparing a plurality of generated feature values to a library of feature values to find a match.

Figure 6:
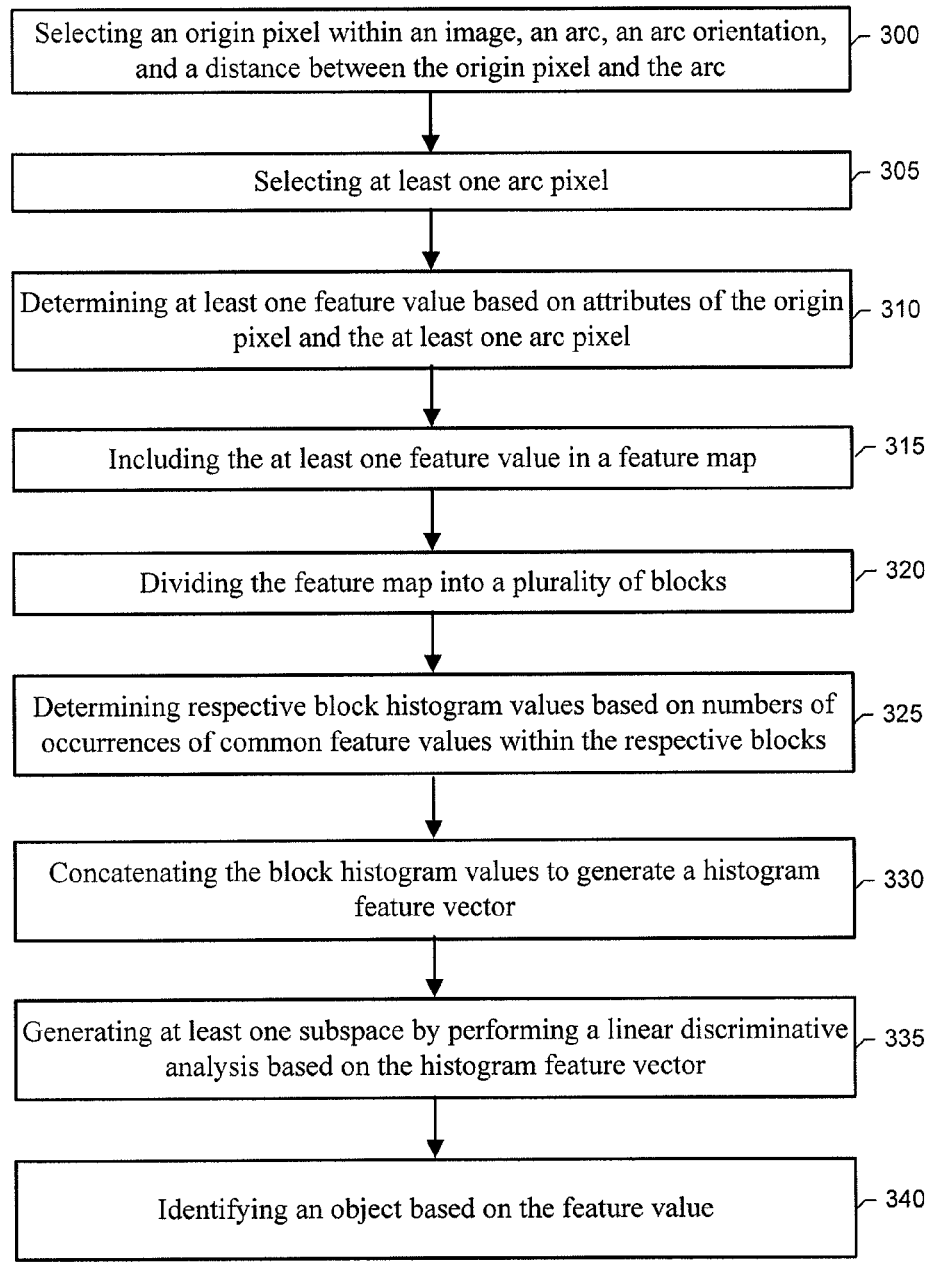
FIG. 6 illustrates an example method for feature extraction using local primitive code according to various example embodiments of the present invention.

FIGS. 2, 4, and 6 illustrate one or more flowcharts of example systems, methods, and/or computer program products according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as memory devices 210, of an example apparatus, such as example apparatus 200, and executed by a processor, such as the processor 205. As will be appreciated, any such program code instructions may be loaded onto a computer or other programmable apparatus (e.g., processor 205, memory device 210) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

FIG. 6 depicts one or more flowcharts of example methods for feature extraction using local primitive code. One example method includes determining, possibly via selection, an origin block within an image, an arc, an arc orientation, and a distance between the origin block and the arc at 300. The origin block may include one or more pixels of the image. In some example embodiments, the arc may be an asymmetric arc. The example method may also include determining, possibly via selection, at least one arc block at 305. Some or all of the arc blocks may include on or more pixels and may be determined such that some or all of the arc blocks are located on the arc. Further, the arc may be located with respect to the origin block based on the arc orientation and the distance.

At 310, the example method may include determining at least one feature value based on attributes of the origin block and the at least one arc block. In this regard, according to some example embodiments, the attributes of the origin block and the at least one arc block may be gray values associated with the blocks. To determine the at least one feature value, the example method may include determining an origin block gray value for the origin block and at least one arc block gray value for the at least one arc block, and determining the feature value based on a comparison between the origin block gray value and the at least one arc block gray value. The feature value may also be determined based on a predefined ordering of the at least one arc block.

According to some example embodiments, the example method may further include combining or aggregating one or more feature values. In this regard, the at least one feature value may be included in a feature map at 315. The feature map may include a plurality of feature values. At 320, the feature map may be divided into a plurality of map blocks. For some or all of the map blocks, a respective map block histogram value may be determined at 325 based on numbers of occurrences of common feature values within the respective map blocks. Upon generating map block histogram values for some or all of the map blocks, the map block histogram values may be concatenated to generate a histogram feature vector at 330. In some example embodiments, at least one subspace may be generated by performing a linear discriminative analysis based on a histogram feature vector at 335.

Further, in some example embodiments, the example method may include determining an identity of an object at 340. In some example embodiments, the object to be identified may be a face of an individual. The object may be identified by comparing a plurality of feature values to a library of feature values to find a match.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    determining an origin block within an image, an arc, an arc orientation, and a distance between the origin block and the arc, the origin block including one or more pixels of the image;
    determining at least one arc block, the arc block being located on the arc and the arc being located with respect to the origin block based on the arc orientation and the distance, the at least one arc block including one or more pixels of the image; and
    determining, via a processor, at least one feature value based on attributes of the origin block and the at least one arc block.

2. The method of claim 1, wherein determining the at least one feature value includes:
    determining an origin block gray value for the origin block and at least one arc block gray value for the at least one arc block; and
    determining the feature value based on a comparison between the origin block gray value and the at least one arc block gray value and an ordering of the at least one arc block.

3. The method of claim 1 further comprising:
    including the at least one feature value in a feature map, the feature map including a plurality of feature values;
    dividing the feature map into a plurality of map blocks;
    determining respective block histogram values based on numbers of occurrences of common feature values within the respective map blocks; and
    concatenating the block histogram values to generate a histogram feature vector.

4. The method of claim 3 further comprising generating at least one subspace by performing a linear discriminative analysis based on the histogram feature vector.

5. The method of claim 1, wherein determining the arc includes determining the arc, the arc being asymmetric.

6. The method of claim 1 further comprising determining an identity of an object by comparing a plurality of feature values including the at least one feature value to a library of feature values to find a match.

7. An apparatus comprising at least one processor and at least one memory including computer program code, the at least one memory and the computer program code configured to, with the at least one processor, cause the apparatus or another apparatus to perform at least the following:
    determining an origin block within an image, an arc, an arc orientation, and a distance between the origin block and the arc, the origin block including one or more pixels of the image;
    determining at least one arc block, the arc block being located on the arc and the arc being located with respect to the origin block based on the arc orientation and the distance, the at least one arc block including one or more pixels of the image; and
    determining at least one feature value based on attributes of the origin block and the at least one arc block.

8. The apparatus of claim 7, wherein the apparatus or the other apparatus caused to perform determining at least one feature value includes being caused to perform:
    determining an origin block gray value for the origin block and at least one arc block gray value for the at least one arc block; and
    determining the feature value based on a comparison between the origin block gray value and the at least one arc block gray value and an ordering of the at least one arc block.

9. The apparatus of claim 7, wherein the apparatus or the other apparatus are further caused to perform:
    including the at least one feature value in a feature map, the feature map including a plurality of feature values;
    dividing the feature map into a plurality of map blocks;
    determining respective block histogram values based on numbers of occurrences of common feature values within the respective map blocks; and
    concatenating the block histogram values to generate a histogram feature vector.

10. The apparatus of claim 9, wherein the apparatus or the other apparatus is further caused to perform generating at least one subspace by performing a linear discriminative analysis based on the histogram feature vector.

11. The apparatus of claim 7, wherein the apparatus or the other apparatus caused to perform determining the arc includes being caused to perform determining the arc, the arc being asymmetric.

12. The apparatus of claim 7, wherein the apparatus or the other apparatus is further caused to perform determining an identity of an object by comparing a plurality of feature values including the at least one feature value to a library of feature values to find a match.

13. The apparatus of claim 7, wherein the apparatus of the other apparatus is further caused to perform capturing the image.

14. The apparatus of claim 7, wherein the apparatus or the other apparatus comprises a mobile terminal.

15. An computer program product comprising at least one non-transitory computer-readable storage medium having executable computer-readable program code instructions stored therein, the computer-readable program code instructions configured to:
   determine an origin block within an image, an arc, an arc orientation, and a distance between the origin block and the arc, the origin block including one or more pixels of the image;
   determine at least one arc block, the arc block being located on the arc and the arc being located with respect to the origin block based on the arc orientation and the distance, the at least one arc block including one or more pixels of the image; and
   determine at least one feature value based on attributes of the origin block and the at least one arc block.

16. The computer program product of claim 15, wherein the computer-readable program code instructions configured to determine at least one feature value include being configured to:
   determine an origin block gray value for the origin block and at least one arc block gray value for the at least one arc block; and
   determine the feature value based on a comparison between the origin block gray value and the at least one arc block gray value and an ordering of the at least one arc block.

17. The computer program product of claim 15, wherein the computer-readable program code instructions are further configured to:
   include the at least one feature value in a feature map, the feature map including a plurality of feature values;
   divide the feature map into a plurality of map blocks;
   determine respective block histogram values based on numbers of occurrences of common feature values within the respective map blocks; and
   concatenate the block histogram values to generate a histogram feature vector.

18. The computer program product of claim 17, wherein the computer-readable program code instructions are further configured to generate at least one subspace by performing a linear discriminative analysis based on the histogram feature vector.

19. The computer program product of claim 15, wherein the computer-readable program code instructions configured to determine the arc include being configured to determine the arc, the arc being asymmetric.

20. The computer program product of claim 15, wherein the computer-readable program code instructions are further configured to determine an identity of an object by comparing a plurality of feature values including the at least one feature value to a library of feature values to find a match.

* * * * *